US010031644B2

(12) United States Patent
Turner et al.

(10) Patent No.: US 10,031,644 B2
(45) Date of Patent: Jul. 24, 2018

(54) PLATFORM TO INFLUENCE CHANNELIZATION OF CUSTOMIZED INFORMATION TO A USER

(71) Applicant: HomeAway.com, Inc., Austin, TX (US)

(72) Inventors: Ryan Hedley Turner, Austin, TX (US); Daniel Steven Haligas, Panama City, FL (US); Velayudhan Pillai Venugopal, Austin, TX (US); Alex Holm Devine, Austin, TX (US)

(73) Assignee: HomeAway.com, Inc., Austin, TX (US)

( * ) Notice: Subject to any disclaimer, the term of this patent is extended or adjusted under 35 U.S.C. 154(b) by 0 days.

(21) Appl. No.: 14/594,728

(22) Filed: Jan. 12, 2015

(65) Prior Publication Data

US 2016/0205506 A1 Jul. 14, 2016

(51) Int. Cl.
| | |
|---|---|
| *H04W 4/02* | (2018.01) |
| *G06F 3/0482* | (2013.01) |
| *G06F 3/0481* | (2013.01) |
| *G06F 3/0488* | (2013.01) |
| *G06Q 30/06* | (2012.01) |
| *G06Q 50/12* | (2012.01) |
| *G06Q 50/14* | (2012.01) |
| *G06Q 10/02* | (2012.01) |
| *G06F 9/451* | (2018.01) |

(52) U.S. Cl.
CPC .......... *G06F 3/0482* (2013.01); *G06F 3/0488* (2013.01); *G06F 3/04817* (2013.01); *G06Q 30/0645* (2013.01); *H04W 4/02* (2013.01); *H04W 4/025* (2013.01); *G06F 9/451* (2018.02); *G06Q 10/025* (2013.01); *G06Q 50/12* (2013.01); *G06Q 50/14* (2013.01)

(58) Field of Classification Search
CPC ................................ H04W 64/00; H04W 4/02
USPC ................ 455/456.1, 456.3, 457, 414.2, 456
See application file for complete search history.

(56) References Cited

U.S. PATENT DOCUMENTS

| | | | | |
|---|---|---|---|---|
| 7,343,317 B2* | 3/2008 | Jokinen | .................. | G06Q 30/02 370/328 |
| 8,831,637 B2* | 9/2014 | Stopel | ..................... | H04W 4/18 455/404.2 |

(Continued)

*Primary Examiner* — Kamran Afshar
*Assistant Examiner* — Farid Seyedvosoghi
(74) *Attorney, Agent, or Firm* — Knobbe, Martens, Olson & Bear, LLP

(57) ABSTRACT

Aggregated traveler data may be accessed by subscribers to a content management system. Subscriber data in access requests from one or more subscribers may be used to describe a pool of travelers in the aggregated traveler data that may be concentrated in a geographic location. Location data, temporal data or both, from one or more electronic sources and/or data stores may be processed to determine if a selected traveler will be positioned within a threshold of an allowable distance from an allowable event in the geographic location at a time coincident with an event time window for the allowable event. Selected travelers who meet location and/or temporal parameters may be targeted to receive customized content for events including activities, services, goods, suggestions, and recommendations from subscribers. A subscriber may own a rental property in the geographic location that is rented by a selected traveler.

15 Claims, 9 Drawing Sheets

(56) References Cited

U.S. PATENT DOCUMENTS

| | | | | |
|---|---|---|---|---|
| 2004/0243664 | A1* | 12/2004 | Horstemeyer | B60R 25/102 709/200 |
| 2004/0263385 | A1* | 12/2004 | Adamczyk | G08B 21/0269 342/357.395 |
| 2007/0287475 | A1* | 12/2007 | Jeong | H04W 4/02 455/456.6 |
| 2008/0032703 | A1* | 2/2008 | Krumm | H04W 4/02 455/456.1 |
| 2015/0005010 | A1* | 1/2015 | Zhang | H04W 4/023 455/456.3 |

* cited by examiner

PLATFORM TO INFLUENCE CHANNELIZATION OF CUSTOMIZED INFORMATION TO A USER

CROSS-REFERENCE TO RELATED APPLICATIONS

This application is related to U.S. patent application Ser. No. 14/562,629, filed on Dec. 5, 2014, titled "Adaptive Advisory Engine and Methods to Predict Preferential Activities Available at a Region Associated with Lodging", to U.S. patent application Ser. No. 14/562,633, filed on Dec. 5, 2014, titled "Travel Customization System and Method to Channelize Travelers relative to Available Activities", and to U.S. patent application Ser. No. 14/564,059, filed on Dec. 8, 2014, titled "Predicting Companion Data Types Associated With A Traveler At A Geographic Region Including Lodging", all of which are hereby incorporated by reference in their entirety for all purposes.

FIELD

The present application relates generally to systems, software, electronic messaging, mobile computing and communication devices. More specifically, systems, methods and software to channelize customized information are disclosed.

BACKGROUND

Owners having a business interest in a geographical location where travelers may stay during a vacation or for other purpose may not be able to take advantage of opportunities to promote events to those travelers. The events may be associated with goods, services, vacation rentals and other commerce. Moreover, owners may not have access to relevant and timely information about travelers in the geographic location that may be used by the owners to target customized offers to specific travelers based on criteria or parameters set by the owner. Owner's may know that travelers are in the geographic location; however, the owner's may lack timely information as to the number of travelers concentrated in the geographic location or locations of those travelers.

Thus, there is a need for devices, systems, methods and software that facilitate communication of channelized information to selected travelers.

BRIEF DESCRIPTION OF THE DRAWINGS

Various embodiments or examples ("examples") of the present application are disclosed in the following detailed description and the accompanying drawings. The drawings are not necessarily to scale.

DETAILED DESCRIPTION

Various embodiments or examples may be implemented in numerous ways, including as a system, a process, a method, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1A:
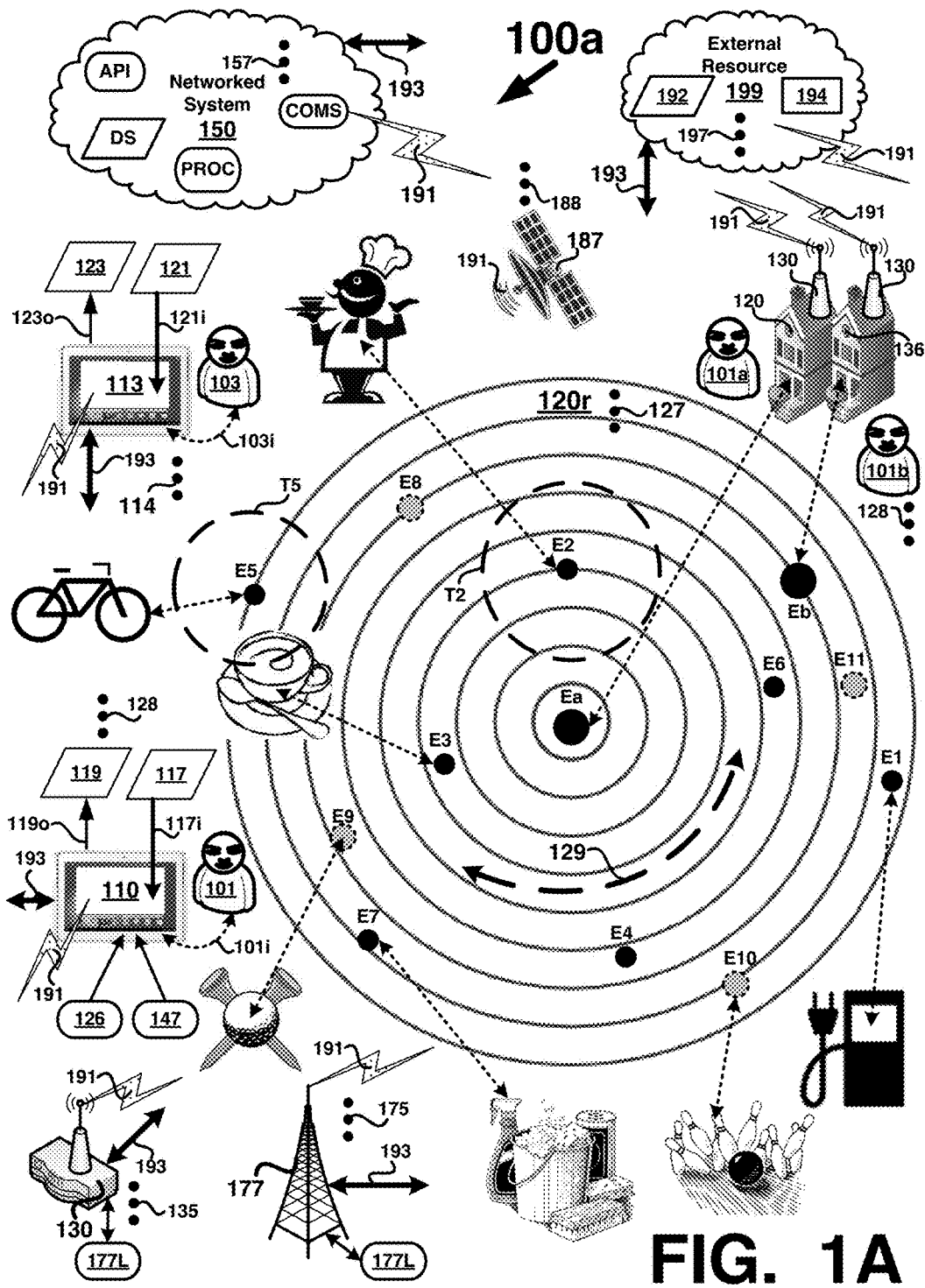
FIG. 1A depicts one example of a geographic location including events and a concentration of travelers.

Attention is now directed to FIG. 1A where one example 100a of a geographic location 120r including events Ea-Eb and E1-E11 and a concentration of travelers 101a-101b are depicted. In FIG. 1A, a networked system 150 may access a pool of traveler data (e.g., from data storage DS) that describes travelers positioned in geographic locations, such as 120r. The pool of traveler data may contain information including but not limited to preferences, traveler demographics, how long travelers are staying in a geographic location, a concentration of travelers in a geographic location, primary events associated with each travelers stay in the geographic location (e.g., a stay at a vacation rental property), location data on travelers in the geographic location, just to name a few, for example. There may be more geographic locations as denoted by 127 and there may be more or fewer travelers and events than depicted in FIG. 1A.

A traveler 101 may have a wireless computing device 110 (e.g., a smartphone, tablet, pad, laptop, PDA, gaming device, etc.) that may be in communication with other systems and/or resources, such as a wireless 191 and/or a wired 193 communications link, an external resource 199 (e.g., Internet, Cloud, etc.), networked system 150, a wireless access point 130, a cellular communications network 140, a communication satellite 187 (e.g., a GPS satellite), just to name a few. There may be more wireless computing devices 110 and travelers 101 as denoted by 128. Wireless computing device 110 will be referred to as device 110 hereinafter. There may be more or fewer wireless access points 130, cellular communications networks 140, and satellites 187 than depicted in FIG. 1A as denoted by 135, 175 and 188 respectively. Data communications between the device 110 and the networked system 150 may be direct (e.g., via 191 and/or 193) or may be routed through one or more other portal computing devices, such as wireless access points 130 and/or cellular communications network 140, for example. Other computing devices, such as a wireless computing device 113 of a subscriber 103 (e.g., an owner of a rental property, a business owner, etc.). Device 113 may also communicate with networked resource 150 using wireless 191 and/or wired 193 communications links. There may be more or fewer devices 113 and subscribers 103 than depicted as denoted by 114.

Traveler device 110 and subscriber device 113 may transmit (119*o*, 123*o*) output data (119, 123) and may receive (117*i*, 121*i*) input data (117, 121). Output data 119 may include location data and/or temporal data generated by or stored in device 110. Temporal data may be generated by an electronic system such as a clock included in device 110. Location data may be generated by radio frequency (RF) systems and/or sensors in device 110. Location data may be received from other communications resources such as access points 130, cellular networks 177, and satellite 187, for example. RF signals (191) communicated between devices 110, 130, 177 may include location data and access points 130 and cellular networks 177 may include a data store that logs or otherwise tracks location data 177L associated with one or more devices 110 in geographic location 120*r*. An application (e.g., APP 126) on device 110 may access from device 110 and/or external systems (e.g., external resource 199, access points 130, cellular network 177, or others), location data (e.g., GPS, geolocation or other locations based services) associated with device 110. Location data 177L from computing devices (e.g., 130, 177) may be used in addition to or instead of location data from device 110 to determine location of traveler 101 in geographic location 120*r*. In some examples, location data may include information on radio frequency (RF) signals emitted by device 110, such as received signal strength indicator (RSSI), RF signal strength, or data included in packets or other data structures included in a RF transmission 191 from device 110 (e.g., MAC Address, IP address, Bluetooth address, etc.).

Wireless communications may include but is not limited to WiFi, WiMAX, Bluetooth, near filed communications (NFC), and cellular (e.g., 2G, 3G, 4G), for example. Wired communications may include but is not limited to local area network (LAN), universal serial bus (USB), FireWire, and Lightning, for example. An external resource 199 may include and/or have access to computing resources 194 and data storage resources 192, and there may be more or fewer computing resources 194 and data storage resources 192 than depicted as denoted by 197. Networked system 150 may also include and/or have access to networked resources, such as computing (PROC) resources, data storage resources (DS), communications interface (COMS), and an applications programming interface (API).

In FIG. 1A, APP 126 executing on a processor of device 110 may access hardware and/or software systems and/or resources of device 110 to transmit 119*o*, data 119 to one or more external systems (e.g., networked system 150). Data 119 may include but is not limited to location data, location history data, temporal data, estimated arrival time (ETA), distance calculation data related to events, access credentials, review data, amended review data, media content, free text, structured text, metadata, and electronic messages, for example. APP 126 may receive 117*i*, data 117 from one or more external systems (e.g., networked system 150). Data 117 may include but is not limited to request(s), push messages (e.g., information on other events for traveler 101 to consider), electronic messages (e.g., text, email, tweets, IM's), verification data (e.g., location data, access credential data), push location data (e.g., location data for other events the traveler 101 may partake in), location history, push events (e.g., events related to offers from subscribers 113 for the traveler 101 to consider), applications (APP's) for client device 110, and configuration data (CFG) (e.g., to configure client device 110).

Further to the example of FIG. 1A, the geographic location 120*r* may include one or more travelers 101, which for purposes of explanation may include two travelers, 101*a* and 101*b*, who are in the geographic location 120*r* for events Ea and Eb respectively. Events Ea and Eb may be associated with a stay by travelers 101*a* and 101*b* at rental properties 120 and 136 (e.g., a vacation rental property) located in geographic location 120*r*. Access points 130 may be disposed at each property (120, 136) to provide data communications access with networked system 150 or other resources, such as external resource 199, for example. During their stay, travelers 101*a* and 101*b* may move 129 about geographic location 120*r* with their respective devices 110 and other systems such as access points 130, cellular networks 177 and satellite 187 may gather location data on each traveler's device 110. Networked system 150 may be configured to manage traveler-related information in the aggregate. Networked system 150 may be a content management system, for example. Some of the traveler-related information may be anonymized and therefore may not describe information on a specific traveler such as 101*a* or 101*b*. Other traveler-related information may be specific to a traveler and may describe data about the traveler including but not limited to demographic data, traveler financial data, traveler characteristics, traveler preferences, traveler spending habits, traveler activities, traveler behaviors, etc., just to name a few. Networked system 150 may serve as a repository of traveler-related information and facilitate a subscriber exchange in which subscriber-participants (e.g., subscriber(s) 113) request access (e.g., via verified access credentials for a user name, password, etc.) to accounts (e.g., one or more data stores) that describes a pool of travelers. An access request by a subscriber 103 may be used to determine a pool of travelers that in a geographic location (e.g., 120*r*) that includes services, goods, property (e.g., 120, 136), shops, business interest, activities or other pecuniary interest of the subscriber 103. The data describing the pool of travelers may be used by the subscriber 103 to inform a specific traveler or travelers in the pool of events including but not limited to activities suggested by the subscriber, services offered by the subscriber, goods for sale by the subscriber, recommendations by the subscriber, business operated by the subscriber, etc., just to name a few.

The traveler-related data may be high granular such that the information on the pool of travelers may include a number of travelers that are concentrated a specific geographic location of interest to the subscriber 103. Location data accessed from the traveler-related data and/or traveler devices 110 may be used to calculate the number of travelers in the pool of traveler data that are located in one or more geographic locations.

In FIG. 1A, although two travelers (101*a*, 101*b*) are depicted, there may be many more travelers located in geographic location 120*r* as denoted by 128. As one example, rental 120 where traveler 101*a* is staying may be owned by a subscriber 103*a* (not shown). Similarly, rental 136 where traveler 101*b* is staying may be owned by a subscriber 103*b* (not shown). Events E8, E9, E10 and E11 in location 120*r* may be associated with interests of subscribers 113 as denoted by circles with dashed outline. For example, subscriber 103a (e.g., owner of rental 120) may also own a golf course denoted as event E9, and that golf course may be one of many golf courses in location 120r. Subscriber 103a may use its access to traveler-related data to promote event E9 to travelers 101 in location 120r, and travelers 101 having traveler-related data indicating that the traveler 101 golfs or has in interest in golfing may be specifically targeted by subscriber 103a to receive content to promote attendance at the subscribers golf course (event E9). The travelers targeted need not be only those travelers who are renting from subscriber 103a (e.g., 101a). As one example, traveler-related data for traveler 101b indicates a preference for golfing, then traveler 101b and others in the pool with similar interests in golfing may be specifically targeted to receive information promoting event E9.

As another example, subscriber 103b (e.g., owner of rental 136) may also own a bowling alley denoted as event E10. Travelers 101 in location 120r having traveler-related data indicating a preference or demographic for bowling, for example, may be specifically targeted to receive information promoting event E10. If traveler 101b who is staying at rental 136 has no interest in bowling, then traveler 101b may not receive targeted information promoting event E10, or subscriber 103b may target traveler 101b anyway as a courtesy extended to his/her renters on the outside chance that traveler 101b may decide to give bowling a try. Events E8 and E11 may be other events associated with other subscribers 113 who rental units in location 120r and have determined via an access request that there is a concentration of travelers 101 having traveler-related data that indicates those travelers 101 may have in interest in events E8 and/or E11, and subsequently may be targeted to receive information promoting events E8 and/or E11.

Subscribers 103 who may have no relationship to rental property in location 120r may have interest in promoting events denoted as E1-E7. As one example, a subscriber 103 may have a business interest in events E3 (an Espresso Café) and E5 (a bicycle shop). Traveler-related data indicating that a traveler 101 is a biker, is renting or traveling by bike while in location 120r may be targeted to receive information promoting the bicycle shop (event E5). Traveler-related data indicating that a traveler 101 has a preference or demographic make-up that is consistent with espresso drinks, may be targeted to receive information promoting the espresso shop (event E3). In some examples, travelers 101 having traveler-related data indicating a like for bicycling or espresso may be targeted to receive information promoting both events (E3 and E5). For example, a known espresso drinking traveler 101 may decide to take advantage of the event E3 and buy an espresso drink, and may later decide to tryout a bicycle rental by taking advantage of event E5.

Other subscribers 113 (e.g., merchants, service providers, etc.) may promote other events in location 120r. As one example, a subscriber 103 owning a restaurant associated with event E2 may access the pool of traveler-related data to determine which travelers 101 are within a threshold distance T2 of event E2 and target travelers 101 that meet the threshold distance requirement with information promoting event E2. Granulized traveler data may allow for granular access request. For example, event E2 may be a seafood restaurant located 3 blocks from a beach and is open only 6 months a year. Subscriber 103 may wish to promote a discount at event E2 only for travelers 101 traveling with family (e.g., obtained from traveler data) staying within a threshold distance T2 of 1 mile from event E2 and who have not yet visited the seafood restaurant during the 6-month time frame when the restaurant is open. Location history included in the traveler-related data, GPS data logging of locations of the traveler 101, location data from traveler device 110 and/or other data may be used to target the discount promotion to travelers 101 who match the subscriber's 103 access request parameters.

A threshold, such as T2, or others, may be applied to all selected travelers 101 to be applied to a portion of selected travelers 101. A threshold may be used to determine if a selected traveler will be positioned within a threshold of an allowable distance from an allowable event in the geographic location 120r. Other parameters, such as time, rate of travel, closing distance between a traveler 101 and the event, estimated time of arrival of a traveler 101 at the event, or others, may be used along with the threshold, such as a requirement that a selected traveler be positioned within the threshold of the allowable distance from the allowable event in the geographic location 120r at a time that is coincident with an event time window for the allowable event. For example, for event E5 associated with the aforementioned bicycle shop may include a threshold T5 which may be applied to a subset of selected travelers who are within an allowable distance of 300 meters of the event E5 and who have traveler-related data (e.g., purchasing history) indicating the traveler 101 has purchased bicycle parts or accessories costing $350 or more in the previous 12 months. Other selected travelers may still be offered the promotion to patronize the bicycle shop (E5) as well as the espresso shop (E3). Therefore, selected travelers 101 may be partitioned into different promotion categories for the same event based on differences in traveler-related data the subscriber 103 wishes to target using an access request.

As another example, the subscriber who owns rental 120 may have information indicating the traveler 101 is driving an electric vehicle. The subscriber 103 may send an electronic message, push notification, or other information to inform the traveler 101 of an electric vehicle charging station denoted as event E1. In some examples a subscriber 103 may promote an event in consideration for value from the owner of that event, such as in the case where, subscriber 103 promotes the electric vehicle charging station event E1 in return for financial compensation or in-kind compensation from the owner of event E1. In-kind compensation may include the owner of E1 promoting rental unit for event Ea (e.g., 120) to other travelers 101.

Figure 1B:
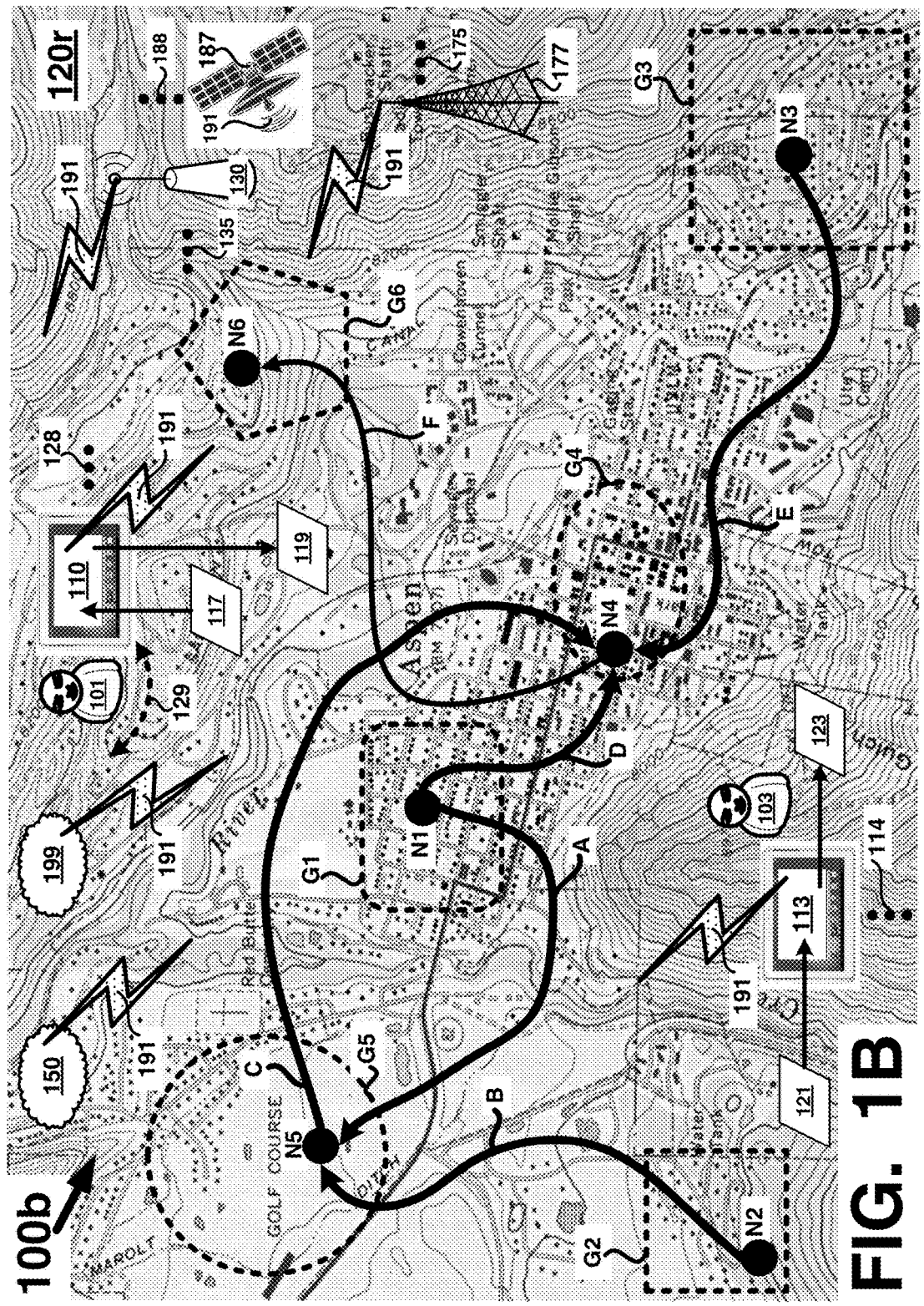
FIG. 1B depicts one example of travelers concentrated in sub-geographical locations within a geographical location.

Referring now to FIG. 1B where one example 100b of travelers 101 concentrated in sub-geographical locations within a geographical location are depicted. In FIG. 1B, geographical location 120r may be sub-divided into sub-geographical locations G1-G6. Sub-geographical locations G1, G2 and G3 may be concentrations of travelers 101 in areas in 120r where rental housing is located; whereas, sub-geographical locations G4, G5, G6 may be associated with areas in 120r where travelers 101 are concentrated for activities located in those sub-geographical locations. Sub-geographical location G5 may be a golf course having a number N5 of travelers 101 concentrated there for golf activities. Sub-geographical location G6 may be an open space having a number N6 of travelers 101 concentrated there for hiking. Sub-geographical location G4 may be a downtown shopping district having a number N4 of travelers 101 concentrated there for shopping, entertainment, dining, etc.

Subscribers 113 may format access requests to promote events in one or more of the sub-geographical locations G1-G6. Location tracking, location data, a location history database, and communications resources such as 130, 177, 187 and 110 may provide location data necessary to determine concentrations (e.g., N1-N6) of travelers 101 in each of the sub-geographical locations G1-G6. As a first example, a subscriber 103 having an interest in the golf course G5 may target travelers 101 concentrated in G2 and G1 to move A and B from one area in location 120*r* to another location in 120*r*, such as, to events at G5. Accordingly, the number of travelers 101 concentrated (N1, N2 and N5) in the sub-geographical locations may change as a result of traveler 101 movement (A, B) and those changes in concentration may be determined from location data in real-time or near real-time. As a second example, subscribers 113 having interests in the downtown district G4 may target travelers 101 in sub-geographical locations G3, G1, and G5 to move C, D and E to G4. As a third example, subscriber 103 having an interest in open space area G6 may target travelers 101 to move F from G4 to G6. Selected travelers 101 that move (A-F) in response to target information from subscribers 113 change the concentration of travelers 101 in the sub-geographical locations they move from and in the sub-geographical locations they move to. The movement (A-F) may be tracked using location data and may be taken advantage of by subscribers 113 to target travelers 101 having different traveler-related data as those travelers enter or exit the sub-geographical locations.

Figure 1C:
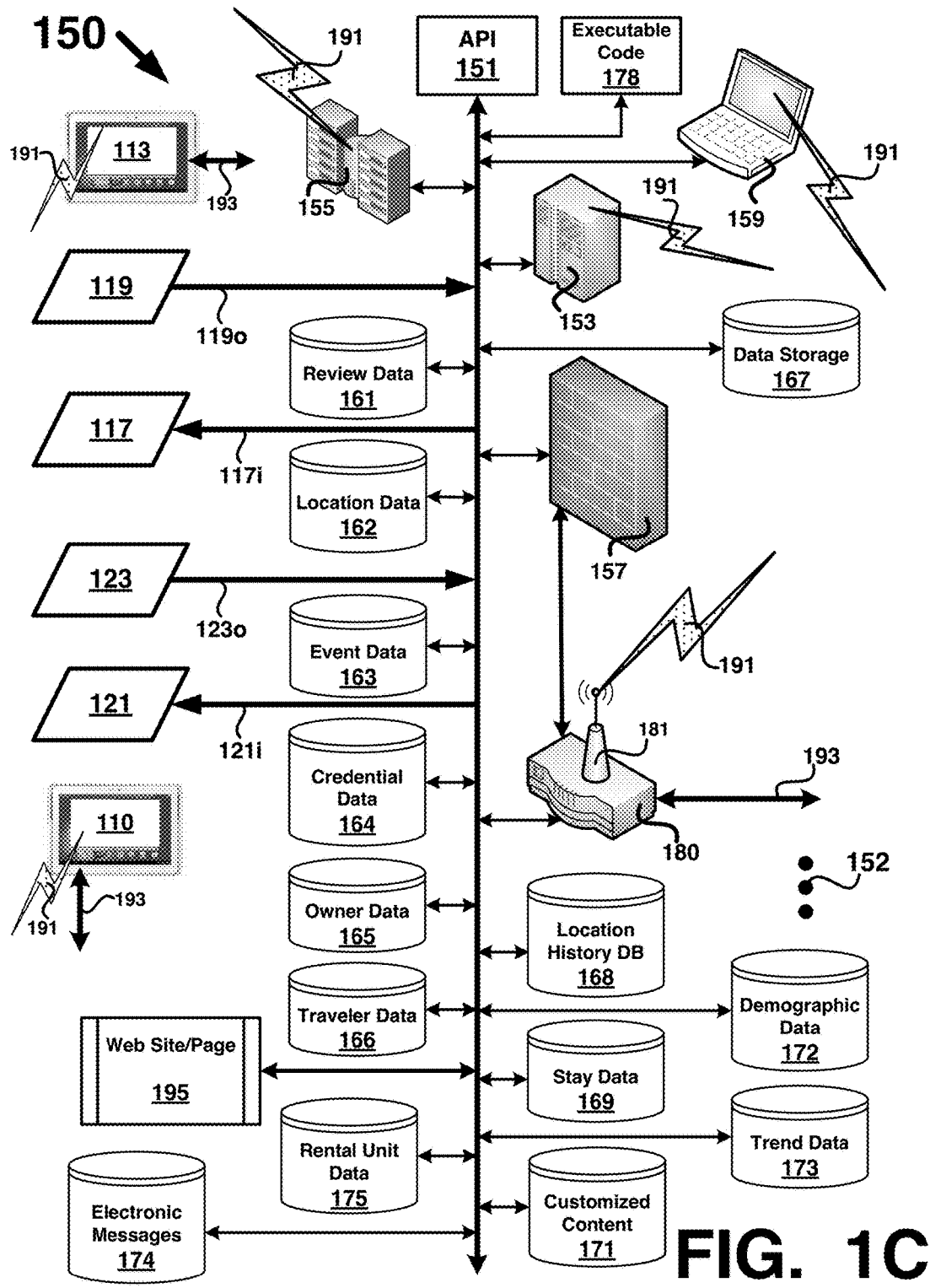
FIG. 1C depicts one example of a networked system.

Reference is now made to FIG. 1C where one example of a networked system 150 is depicted. Networked system 150 may be in wired 193 and/or wireless 191 communications with other devices and systems, including but not limited to external resource 199 and its associated resources (192, 194), traveler device 110, owner device 113, and other computing devices, just to name a few. Networked system 150 may include resources in communications with one another, that may include but is not limited to an application program interface (API) 151, executable code 178, one or more laptop computers 159, one or more servers 153, a communications interface 180 that may include wireless 191 and wired 193 links, firewall 157, one or more server farms 155, data storage 167, review data 161, location data 162, location history data 168, (e.g., a location history data base), event data 163, credential data 164, owner data 165, traveler data 166, stay data 169 (e.g., beginning/ending dates and/or times for a stay), demographic data 172, trend data 173, targeted content 171, rental unit data 175, and electronic messages 174. In some examples, data storage 167 may include one or more of the other data storage categories (e.g., 461-475). In other examples, data storage resources accessed by networked system 150 may be external to networked system 150 (e.g., positioned in external resource 199). One or more of the flows depicted in FIGS. 3-4 may be implemented using executable code 178 and/or API 151, for example. For purposes of explanation, a computing resource (e.g., 153, 155, 159) depicted in FIG. 1C may be referred to as a networked computing device and a data storage resource (e.g., 161-175) may be referred to as data storage. For example, data 119 may be received by networked computing resource 153 via communications interface 180. In some examples, a computing device that transmitted the data 119 may be referred to as a traveler device (e.g., 110) or a portal computing device (e.g., 130, 177). As another example, data 123 from a subscriber device 113 may be received by networked computing resource 153 via communications interface 180 and the data 123 may include an access request and may also include credential data for the subscriber 113, that once verified, allows data communications access to networked system 150.

Traveler device 110 and/or subscriber device 113 may communicate (191, 193) with networked system 150 via a Web Site/Web Page 195 (e.g., using a browser or application on a laptop, PC, wireless device, smartphone, pad, tablet, touch screen device, etc.). Information (117, 119, 121, 123) may be viewed, entered, transmitted, received, or otherwise communicated (191, 193) between networked system 150 and another device (e.g., 110, 113, etc.) using Web Site/Page 195. Reviews, amended reviews or other data associated with event 120 or other events (e.g., Ea-Eb and/or E1-E11) may be communicated via Web Site/Page 195. Network service 150 may require access be granted to a device (e.g., 110, 113, etc.) prior to allowing data communication with the networked service 150 via Web Site/Page 195. Traveler device 110 may include a biometric sensor (e.g., a fingerprint scanner) to verify access credentials for data communications between networked system 150 and traveler device 110, for example.

Review data 161 may include review data and/or amended review data (119, 123), and may include formatted reviews for publication to other users of networked system 150. Review data 161 may include location data and/or credential data from a computing device (e.g., 110, 113) that may be compared to location data in 162 and/or credential data in 164. Review data 161 may include review data files for formatted reviews and may include amended review data files. In some examples, data 119 and/or 123 may include amended review data. Review and/or amended review data may be associated with a stay by a traveler 101 in a rental unit (e.g., 120, Ea, Eb) in location 120*r*, for example. Review and/or amended review data may be associated with a non-rental unit event (e.g., goods, services, etc.) in location 120*r*, such as a restaurant event E2 or bicycle shop event E5.

Location data 162 may include locations (e.g., GPS data and/or other location data) associated with events (e.g., events in 120*r*) and locations around events (e.g., in approximately the same locale as an event). Examples of location around an event may include but are not limited to a park across the street from an event, a cafe of coffee shop down the street from an event, etc. Examples of owner locations may include location data associated with use of the subscriber device 113, such as location data from cellular networks (e.g., in the city or state the owner or a rental property or other types of events lives in), WiFi networks, WiMAX networks, etc.

Event data 163 may include data for events, such as a stay at a vacation rental (e.g., event 120), an entertainment venue, a bar, a grocery store, a bakery, goods, services, business, restaurants, etc. that may be the primary event for traveler 101 or may be associated with activities the traveler 101 partakes in during his/her stay at the primary event (e.g., the stay at the vacation rental 120). Event data 163 may be data for one or more events E0-E11 or Ea-Eb, for example.

Location history data base 168 may include location data tracked and stored over time based on various locations visited by traveler 101 with a computing device (e.g., traveler device 110) that includes or has access to internal/external sources of location data, such as satellite 187, access points 130, cellular networks 177, etc. Validation of location of a traveler 101 may include accessing data in location data 162, location history data base 168, or both. In some examples, a computing device that communicates the data 119 may include location history data base (LH DB) 147 which may include the same or different data than location history data base 168. In some examples location data in one of the location history data bases may be used to update and/or replace location data in the other location history data base. For example, location data in LH DB 147 of device 110 may be received 119 and stored in location history data base 168. As another example, location data in location history data base 168 may be received 117 and stored in LH DB 147. Data in location history data base (168, 147) may be used to predict based on past location history, a future location of traveler 101 and that predicted location may be used to customize information communicated to traveler 101. For example, if traveler 101 walks from event 120 to a shopping district in region 120r every morning, then events (e.g., in FIG. 1B) located in the shopping district may be promoted to traveler 101 via an electronic message transmitted to device 110 during each morning of the traveler's stay.

Credential data 164 (e.g., access credentials, user name, password, etc.) may be a data store where access data is retained for various events, subscriber properties, etc. For example, credential data 164 may include credentials for WiFi access points (e.g., 130) in subscriber properties (e.g., 120, 136), businesses that may be promoted by the subscriber 103 or by an agent acting on behalf of the subscriber, etc. Other forms of credentials may be included in credential data 164, such as access credentials for traveler devices (e.g., 110), locks on doors needed to gain access to a rental property or other protected area associated with a stay at an event (e.g., event 120, Ea, Eb), for example.

Demographic data 172 may include data about a large pool of travelers, including traveler 101. Demographic data may be based on zip code data, income data, spending pattern data, travel data, and other data about travelers that may be used to determine habits, preferences, education, profession, occupation, spending power, financial worth, etc. Demographic data about traveler 101 that is accessed from traveler data 166 may be compared with demographic data from a larger pool of similar travelers in demographic data 172 to make predictions on behavior, activities, events, and other characteristics associated with traveler 101 that may be used to determine what types of customized information to communicate to the traveler during a stay in location 120r.

Trend data 173 may include real time data on trends occurring in the location 120r associated with an event (e.g., event 120). Trend data 173 may be included in data (119, 123) and may be provided by travelers (e.g., 101 or others), subscribers (e.g., 103), media sources, reviews, tweets, emails, or other forms of electronic media and/or messaging. Trend data 173 may be used to compose content for electronic messages or push notifications (e.g., 174) that may be communicated (117, 121) to computing devices (e.g., 110 and/or 113). For example, if kite flying is trending in geographic location 120r, a store selling kites may customize content for travelers 101 with families (e.g., family data accessed from traveler data 166), for example.

Customized content 171 may include data directed to a traveler (e.g., 101) based on one or more of traveler demographics, preferences, location, location history, spending patterns, etc., just to name a few. Targeted content 171 may be communicated to device 110 as an electronic message or push notification, for example. A subscriber 103 having access to networked system 150 may compose targeted content 171 at one or more travelers 101 whose location in 120r or a sub-location in 120r, coincides with a business interest of the subscriber 113. For example, a proprietor of a skate board shop who has information on travelers in location 120r (e.g., traveler 101 or other travelers) that indicates those travelers have an interest in skate boarding, may target content for skate board purchase, rental or parts to those travelers.

Electronic messages 174 may be a data store for incoming and/or outgoing electronic messages, such as emails, push notifications, push events, and electronic messages generated by networked system 150, for example. Electronic messages 174 may include data in 117, 121, 119 and 123, for example. Electronic messages 174 may be presented on display of device 110, 113, or web site/page 195, for example.

Rental unit data 175 may include information on a rental unit (e.g., event 120, 136, Ea, Eb) that may be accessed by traveler 101, such as amenities, rental policies (e.g., no smoking, no pets), parking instructions/locations/restrictions, maps, address information, electronic devices in the rental unit, appliances, maintenance contact information, owner information, emergency information, policies for use of facilities (e.g., swimming pools, workout room, club house, etc.), just to name a few.

Owner data 165 may include data about subscribers (e.g., 103), such as property addresses, owner address and contact information, email accounts, account information for a vacation rental agency the owner uses to manage stays by guests, data on owner devices 113 (e.g., MAC address or other forms of device ID, etc.).

Traveler data 166 may include data about travelers (e.g., 101), such as addresses and contact information, email accounts, traveler demographics, data on traveler devices 110 (e.g., MAC address or other forms of device ID, etc.), financial accounts for deposits, payments, refunds, etc.

Stay data 169 may include data for an event such as stay dates, check-in/check-out times/dates, event address, maps to events, directions to events, event categories for different types of events (e.g., vacation rental events, restaurant events, casino events, etc.).

Data storage 167 may be used as a data store that may be accessed by other components internal to and/or external to networked system 150. Networked system 150 may include more or fewer resources than depicted in FIG. 1C as denoted by 152.

Access request (e.g., received in a data transmission 123) may include data entered by subscribers 103 that may be used as search data (e.g., textual search strings, structured text) to search one or more data stores (e.g., 161-175) of networked system 150 to obtain traveler-related data. A subscriber 103 may have several rental units and/or business interest spread across different geographic locations and an access request may include data specifying a single geographic location or multiple geographic locations. As described above in regard to FIG. 1B, a subscriber 113 may specify sub-geographic locations (e.g., G1-G6) in a primary geographic location (e.g., 120r) as one of the parameters of an access request. Non-limiting examples of data that may be included in an access request includes gender, height, ethnicity, religion, race, education, family size, marital status, sexual orientation, diet, physical activities of travelers 113, just to name a few. A portion of the traveler-related data may be anonymized to protect privacy interest or if the information is generic in nature, for example.

Networked system 150 may share data processing with external devices, such as traveler devices 110, subscriber devices 113, external resource 199, for example. As one example, hardware systems (e.g., circuitry, sensors 230, clock 240) of traveler device 110 may perform calculations, signal processing or other electronic functions and communicate data (e.g., via 119) to networked system 150. For example, location data resources of device 110 in conjunction with circuitry that receives signals from sensors 230 and/or clock 240 may be used to determine a rate of speed and direction (e.g., velocity) of traveler device 110, and data from that determination may be communicated (e.g., via 191 and 119) to networked system 150. The data may be used to calculate whether or not a traveler 101 is heading toward and event in 120r or away from and event in 120r. The data may be used to determine if the traveler 101 will arrive at an event in 120r within a specified time window set for the event or will enter into the threshold distance (e.g., T2, T5) for the event within a specified time window based on a velocity of the traveler 101 (e.g., as sensed by device 110). As one example, of location data for N travelers 101 located in 120r indicated that M out of N travelers 101 are heading towards an event (e.g., have a velocity vector in a direction towards the event) and P out of N travelers 101 are heading away from the event (e.g., have a velocity vector in a direction away from the event), then customized content may only be communicated to those travelers that are heading towards the event. As a second example, if only half of the M out of N travelers 101 that are heading towards the event are estimated to arrive at the event within an event time window, then the customized content may only be communicated to those travelers 101 predicted to arrive within the event window. For example, if the event is at a bar that closes at 1:00 am and half the travelers 101 heading to the bar have an estimated arrival at about 12:50 am and the other half have an estimated arrival of 10:30 pm, then the customized content may be communicated only to those travelers 101 estimated to arrive at 10:30 pm.

Figure 2:
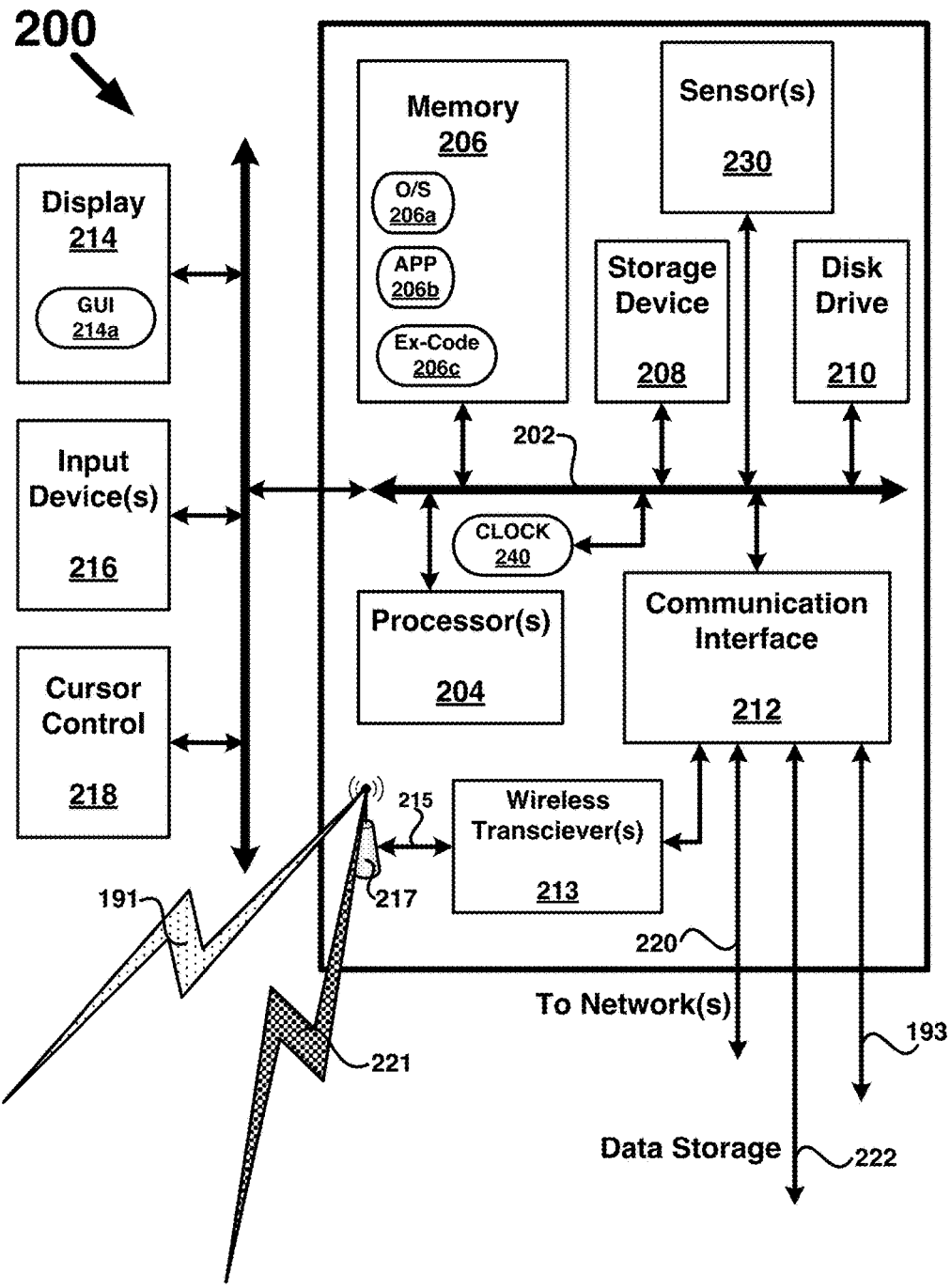
FIG. 2 depicts one example of a computer system.

FIG. 2 illustrates an exemplary computer system 200 suitable for use in one or more systems, devices, compute engines, apparatus, traveler devices, subscriber devices, wireless devices, wireless systems, backend systems, front end systems, networked systems, data storage devices, data storage systems, external resources, host devices or others described in reference to FIGS. 1A-1C. In some examples, computer system 200 may be used to implement computer programs, algorithms, an application (APP), an application programming interface (API), configurations, methods, processes, or other software to perform the above-described techniques. Computer system 200 may include circuitry, hardware, and other electronic systems to perform the above-described techniques. Computer system 200 may include a bus 202 or other communication mechanism for communicating information, which interconnects subsystems and devices, such as one or more processors 204 (e.g., pC, pP, DSP, ASIC, FPGA, Baseband, etc.), system memory 206 (e.g., RAM, SRAM, DRAM, Flash), storage device 208 (e.g., Flash, ROM), disk drive 210 (e.g., magnetic, optical, solid state), communication interface 212 (e.g., modem, Ethernet, WiFi, Cellular), display 214 (e.g., CRT, LCD, LED, OLED, touch screen), input device 216 (e.g., keyboard, stylus, touch screen, mouse, track pad), and cursor control 218 (e.g., mouse, trackball, stylus). Some of the elements depicted in computer system 200 may be optional, such as elements 214-218, and one or more clocks 240 which may provide temporal data, for example, one or more sensors 230 which may provide location data, rate of motion data and other data associated with movement 129, and computer system 200 need not include all of the elements depicted. Display 214 may present a user interface (UI), such as a graphical user interface (GUI) 214a. Memory 206 may include computer executable programs and/or data embodied in a non-transitory computer readable medium, such as an operating system (OS) 206a, an application (APP) 206b, and executable code (Ex-Code) 206c, for example.

According to some examples, computer system 200 performs specific operations by one or more processors 204 executing one or more sequences of one or more instructions stored in system memory 206. Such instructions may be read into system memory 206 from another non-transitory computer readable medium, such as storage device 208 or disk drive 210 (e.g., a HDD or SSD). In some examples, circuitry may be used in place of or in combination with software instructions for implementation. The term "non-transitory computer readable medium" refers to any tangible medium that participates in providing instructions and/or data to processor(s) 204 for execution. Such a medium may take many forms, including but not limited to, non-volatile media and volatile media. Non-volatile media includes, for example, optical, magnetic, or solid state disks, such as disk drive 210. Volatile media includes dynamic memory, such as system memory 206. Common forms of non-transitory computer readable media includes, for example, floppy disk, flexible disk, hard disk, SSD, magnetic tape, any other magnetic medium, CD-ROM, DVD-ROM, Blu-Ray ROM, USB thumb drive, SD Card, any other optical medium, punch cards, paper tape, any other physical medium with patterns of holes, RAM, PROM, EPROM, FLASH-EPROM, any other memory chip or cartridge, or any other medium from which a computer may read.

Sensor(s) 230 may include but are not limited to one or more inertial sensors (e.g., an accelerometer, a multi-axis accelerometer, a gyroscope, a magnetometer, etc.), an altimeter, and a barometer, for example. One or more sensors in sensor(s) 230 may be used to determine location data for a device that includes computer system 200 and/or is in communication with computer system 200 (e.g., a client device, a smartphone, a tablet, a pad, a laptop, PC, a wireless device, a portal computing device, a computing device, a networked computing device, a platform, a backend service, etc.). One or more of the memory 206, storage device 208, or disk drive 210 may be accessed as a data store for location data from sensor(s) 230 or other systems in communication (e.g., via communications interface 212) the computer system 200. Location data may be communicated to/from the computer system 200 via one or more of the wireless transceivers 213.

For example, radio frequency signal sources including but not limited to GPS satellite signals (e.g., signals 191 from one or more GPS satellites 187), terrestrial location transmitters (e.g., one or more cellular towers), WiFi signals, WiMAX signals, WiFi routers, WiFi access points, Bluetooth signals (e.g., Bluetooth beacons), near field communication signals, iBeacons, data from external resource 199, and networked resource 150. Other signal and/or data sources for location data may include but are not limited to audio signals (e.g., ultrasonic signals) and signals and/or data generated by location tracking software (e.g., internal to and/or external to computer system 200), for example. In some examples, location data and/or signals may be communicated wireless communications link (e.g., 191) and/or a wired communications link (e.g., 193). Location data accessed by computer system 200 may include but is not limited to a location history data base (e.g., 147, 168) and location data 162, for example. The location data may be updated, revised or otherwise change on a dynamic basis as the guest device 110 moves 129 around in areas around event 120.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media may include coaxial cables, copper wire, and fiber optics, including wires that comprise bus 202 for transmitting a computer data signal or other signals (e.g., from hardware or circuitry). In some examples, execution of the sequences of instructions may be performed by a single computer system 200. According to some examples, two or more computer systems 200 coupled by communication link 220 (e.g., LAN, Ethernet, PSTN, USB, or wireless network) may perform the sequence of instructions in coordination with one another. Computer system 200 may transmit and receive messages, data, and instructions, including programs, (i.e., application code), through communication link 220 and communication interface 212. Received program code may be executed by processor 204 as it is received, and/or stored in disk drive 210, or other non-volatile storage for later execution. Computer system 200 may optionally include a wireless transceiver 213 coupled with the communication interface 212 and coupled 215 with an antenna 217 for receiving and generating RF signals (191, 221), such as from a WiFi network, WiMAX network, BT radio, Cellular network, networked computing resources, external resource 199, client devices (e.g., 110), owner devices (e.g., 113), near field communication (NFC), satellite network, data storage network, or other wireless network and/or wireless devices, for example. Examples of wireless devices (e.g., client devices) may include but is not limited to those depicted in FIGS. 1A-1C. Communications interface 212 may be coupled 222 with data storage external to computer system 200. Communications interface 212 may be coupled 193 with external resources and/or systems, such as those depicted in FIGS. 1A-1C, for example. Computer system 200 may be used to implement a computing device (e.g., 110, 113), a portal computing device (e.g., 130, 177, 180), a networked computing device (e.g., 153, 155, 159, 180), a networked system (e.g., 150), and an external resource (e.g., 199), for example.

Processor(s) 204 may be coupled 202 with signals from circuitry or other hardware systems of computer system 200. For examples, signals from clock 240, sensors 230, and communications interface (e.g., via wireless transceivers 213) may be processed by processor 204 and/or other circuitry to calculate an estimated time of arrival of the device 110 (e.g., due to motion 129 of traveler 101 carrying device 110) at an event (e.g., such as events Ea-Eb, E1-E11) in geographic location 129. The ETA may be calculated based on time data from clock 240 and one or more of location data, speed data (e.g., scalar data), or velocity data (e.g., vector data). Speed or velocity data may be calculated from signals from sensors 230 and changes in location data as traveler 101 and his/her associated device 110 move 129 relative an some event or other reference point. Rate of travel (e.g., distance traveled per unit of time) may be calculated using signals from clock 240, sensors 230 and/or location data.

Figure 3:
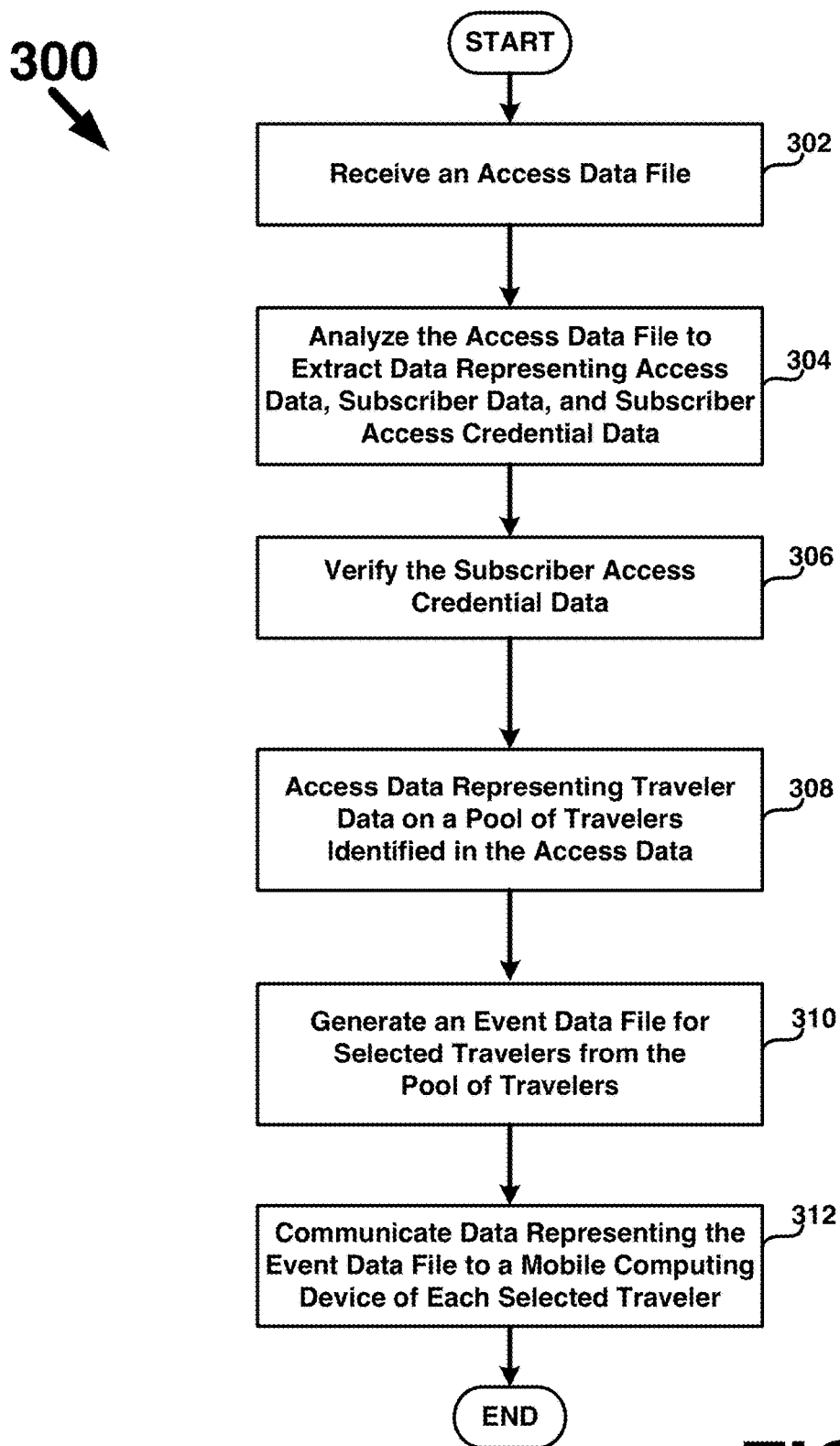
FIG. 3 depicts one example of a flow diagram for generating an event data file for selected travelers in a pool of travelers.

Referring now to FIG. 3 where one example of a flow diagram 300 for generating an event data file for selected travelers in a pool of travelers is depicted. At a stage 302 an access data file may be received. For example, one or more subscriber devices 113 may communicate access data files having access request data composed by one or more subscribers 103. The access data file may be data 123 or may be included in data 123, for example.

At a stage 304 the access data file may be analyzed to extract data representing access data, subscriber data, and subscriber access credential data. If the subscriber access credential data has been previously verified (e.g., the subscriber 103 has already successfully logged in), then the access data file (e.g., 123) may not include the subscriber access credential data.

At a stage 306, if not already verified, then subscriber access credential data is verified (e.g., user name, password, etc.). Data communications access to networked system 150 and its associated data stores may be denied if the subscriber access credential data is not verified.

At a stage 308, data representing traveler data on a pool of travelers identified in the access request data is accessed (e.g., from one or more data stores in networked system 150).

At a stage 310 an event data file for selected travelers from the pool of travelers is generated. The event data file may be generated for selected travelers in the pool of travelers that are in or will be in a geographic location identified in the access data. One or more of the data stores described above in reference to FIG. 1C may be accessed to match access data with data from one or more of the data stores to determine which travelers in the pool of travelers match parameters in the access data and are to be selected as the selected travelers.

At a stage 312 data representing the event data file may be communicated (e.g., 117 via 191 or 193) to a mobile computing device (e.g., 110) of each selected traveler (e.g., 101). The data representing the event data file may include location data, temporal data, or other data describing an event being proposed for the selected traveler to consider (e.g., to patronize the bicycle shop event E5 of FIG. 1A). If there are 97 selected travelers 101 concentrated in a geographic location (e.g., 120r), then each of the 97 selected travelers 101 may receive event data files at their respective traveler devices 110 and the event data files received may be the same or may differ among the 97 selected travelers 101.

Figure 4:
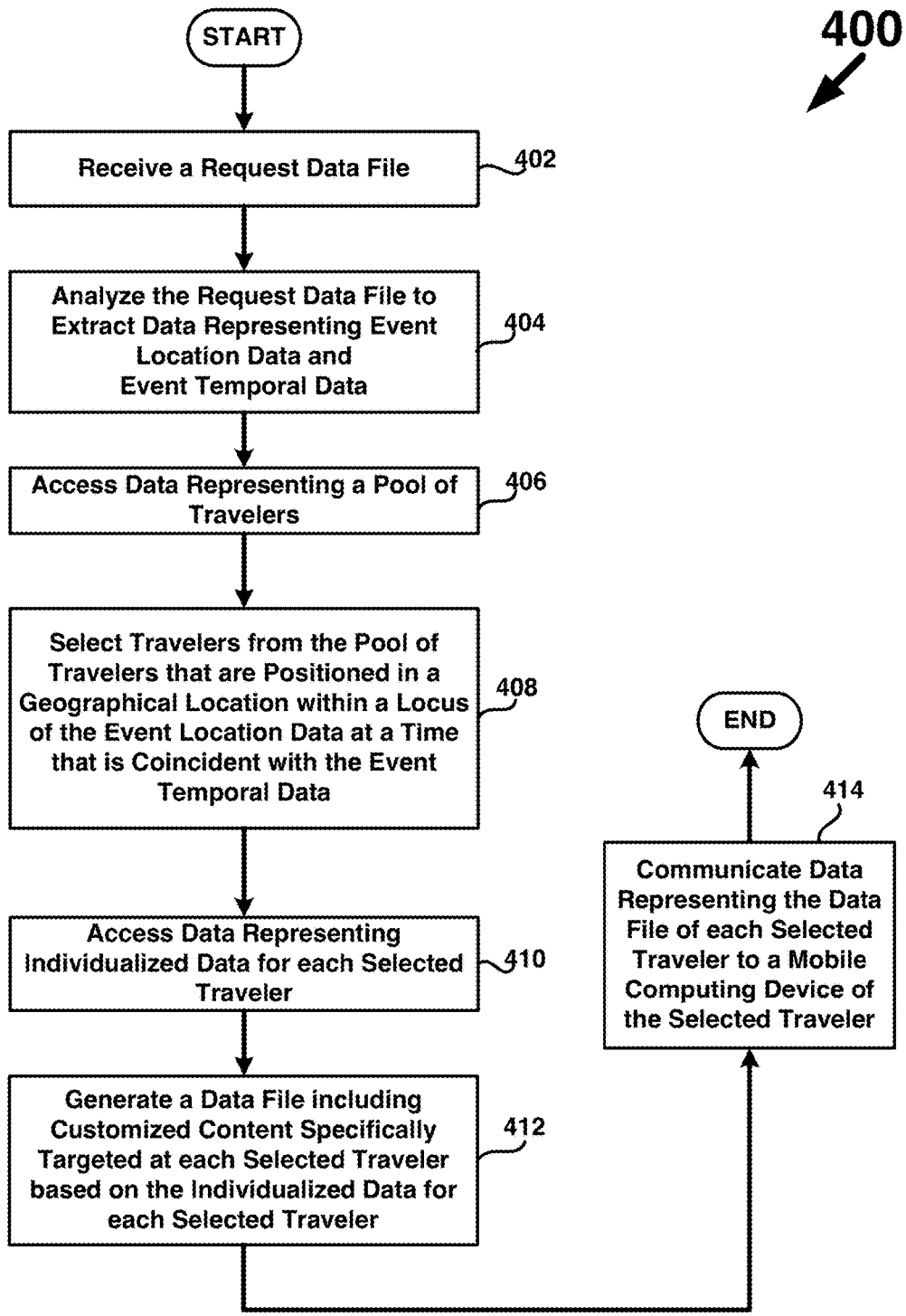
FIG. 4 depicts one example of a flow diagram for generating a data file having customized content targeted at a selected traveler.

Moving now to FIG. 4 where one example of a flow diagram 400 for generating a data file having customized content targeted at a selected traveler is depicted. At a stage 402 a request data may be received (e.g., 123 from device 113). At a stage 404 the received request data file may be analyzed to extract data representing event location data and event temporal data. In some examples, the event temporal data may be omitted because the event the event location data is associated with has no temporal boundaries or limitations, for example.

At a stage 406, data representing a pool of travelers (e.g., traveler data 166 of FIG. 1C) is accessed. At a stage 408, travelers from the pool of travelers that are positioned in a geographical location within a locus of the event location data at a time that is coincident with the event temporal data are selected. If there is no event temporal data, then at the stage 406, travelers may be selected based on being positioned in the geographical location within the locus of the event location data. At the stage 406, selected travelers may already be positioned in the geographical location or may be predicted to be positioned in the geographical location based on data including but not limited to stay data 169, traveler data 166, rental unit data 175, event data 163, and location data 162, for example. As one example, data representing the pool of travelers may indicate that one or more of the travelers that are selected travelers will be at the geographical location at a future time based on travel plans, such as airplane arrival times, etc.

At a stage 410, data representing individualized data for each selected traveler is accessed. At a stage 412, a data file including customized content specifically targeted at each selected traveler is generated based on the individualized data for each selected traveler. Further to the example of event E5 in FIG. 1A, selected travelers who have purchased more the $350 in bicycle parts or accessories in the past 12 months may have customized content specifically targeted to them based on the individualized data regarding their prior $350+ purchases; whereas, other selected travelers who have not purchased more the $350 in bicycle parts or accessories in the past 12 months may have different customized content specifically targeted to them based on their individualized data.

At a stage 414 data representing the data file of each selected traveler may be communicated (e.g., 117 via 191, 193) to a mobile computing device (e.g., 110) of the selected traveler.

Figure 5:
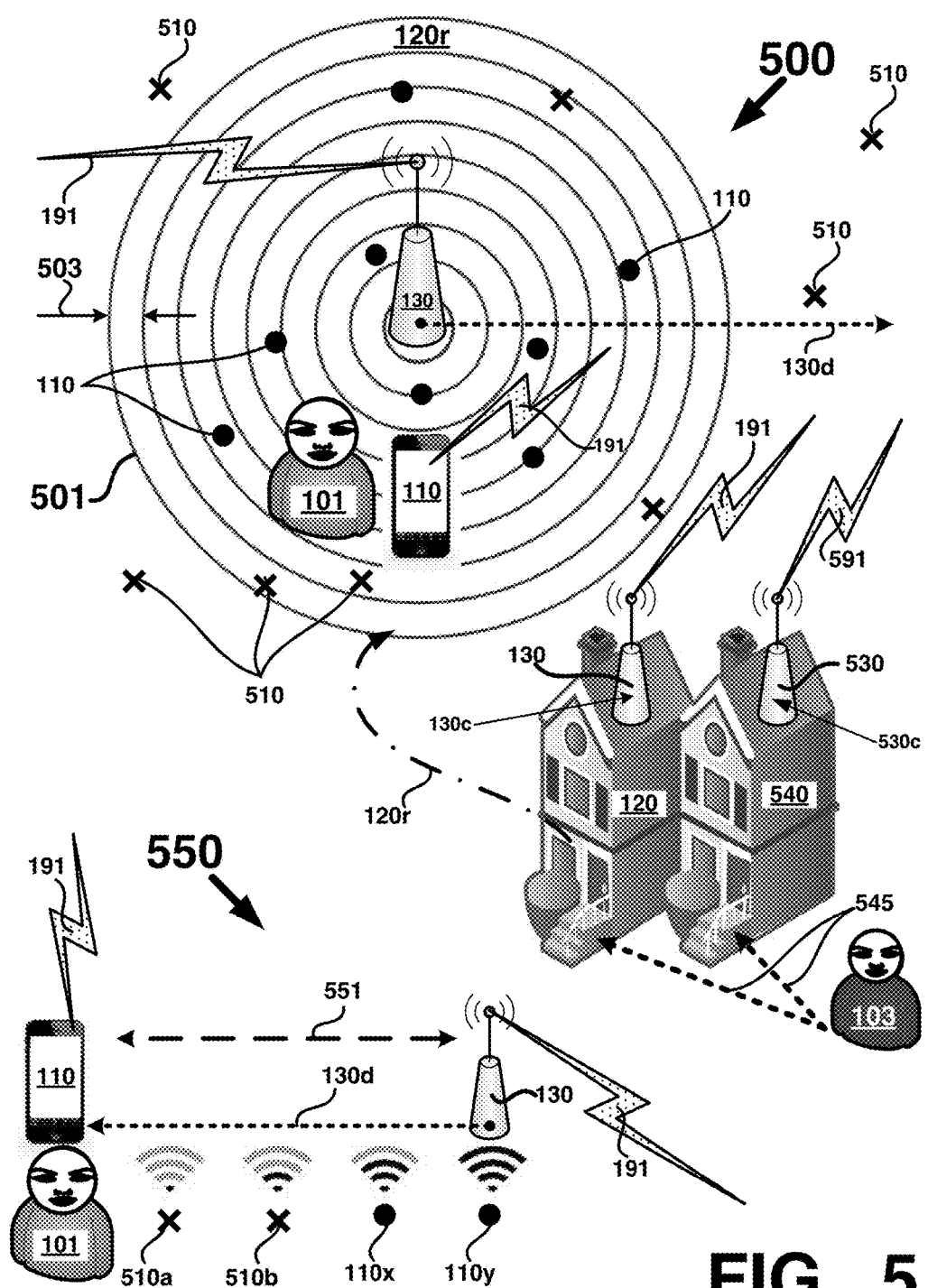
FIG. 5 depicts examples of a threshold for an allowable distance for an allowable location for an event.

Attention is now directed to FIG. 5 where examples 500 and 550 of a threshold for an allowable distance for an allowable location of an event are depicted. In example 500 the event 120 is a stay at a vacation rental unit where guest 101 and his/her client device 110 are present. WiFi access point 130 (e.g., a portal computing device) is positioned in the rental unit and includes access credentials 130c. Concentric circles 501 depict a radial distance 130d centered about access point 130 where a threshold for an allowable distance denoted as a black dot "•" for device 110, for an allowable location (e.g., event 120) may be used by networked computing device (e.g., 153, 155, 159) to determine location data location data as described above in reference to FIGS. 1A-1C, for example. For purposes of explanation a distance 503 between adjacent circles in 501 may be 3 meters, for example. Distances that are not an allowable distance are denoted by a "x" 510 and some of those distances may fall outside of circle 501.

For example, as a distance of the traveler device 110 increases along direction of the arrow for radial distance 130r, locations associated with "x" 510 may increase; whereas, as a distance of the traveler device 110 increases along direction of the arrow for radial distance 130r, locations associated with "•" 110 may increase.

In example 550, as the traveler device 110 moves closer to or further away from access point 130 as denoted by dashed line 551, a RF signal parameter may change as a function of distance along 130d. As an example, RSSI or RF signal strength associated with 1-bar 510a or 2-bars 510b for "x" 510 may be indicative of the client device 110 being outside the allowable distance. On the other hand, at closer distances to access point 130, RSSI or RF signal strength associated with 3-bars 110x or 4-bars 110y for "•" 110 may be indicative of the traveler device 110 being inside the allowable distance. Hardware, software, circuitry, RF systems or the like in access point 130 may include signal strength data indicative of a relatively strong signal (e.g., 4 to 5 bars), an adequate signal (e.g., 3 bars), or a relatively weak signal (e.g., one to two bars) in data 119. The signal strength data may be used by the networked computing system 150 to determine location data. APP 126 may access systems of traveler device 110 (e.g., RF system) and include signal strength data in the data 119 and the signal strength data may be may be used by the networked system 150 to determine location data.

Further to example 500, a subscriber 103 may own 545 both rental units depicted (e.g., 120 and 540). An access point 530 with access credentials 530c in rental unit 540 may be detected by and may even be accessed by traveler device 110 of traveler 101. For example, another guest in 540 may give the access credentials for access point 530 to traveler 101. However, data 119 transmitted by traveler device 110 using access point 530 may not be authenticated due to the credential data in 119 not matching the access credentials assigned to event 120. Use by traveler 101 of access point 530 to communicate data 119 to/from networked system 150 may result in credential data not being authenticated and data communications access being denied. Other communications resources and/or portal computing devices may be used to determine location, such as cellular networks 177, other wireless access points 130 and the associated location data 177L generated by those devices. As one example, two or more cellular networks 177 may be used to locate traveler device 110 in location 120r using triangulation or other location techniques. Access points 130 positioned near or at events (e.g., E0-E11) may be used to sense signals from traveler device 110 and determine a relative location of the traveler device 110.

Figure 6:
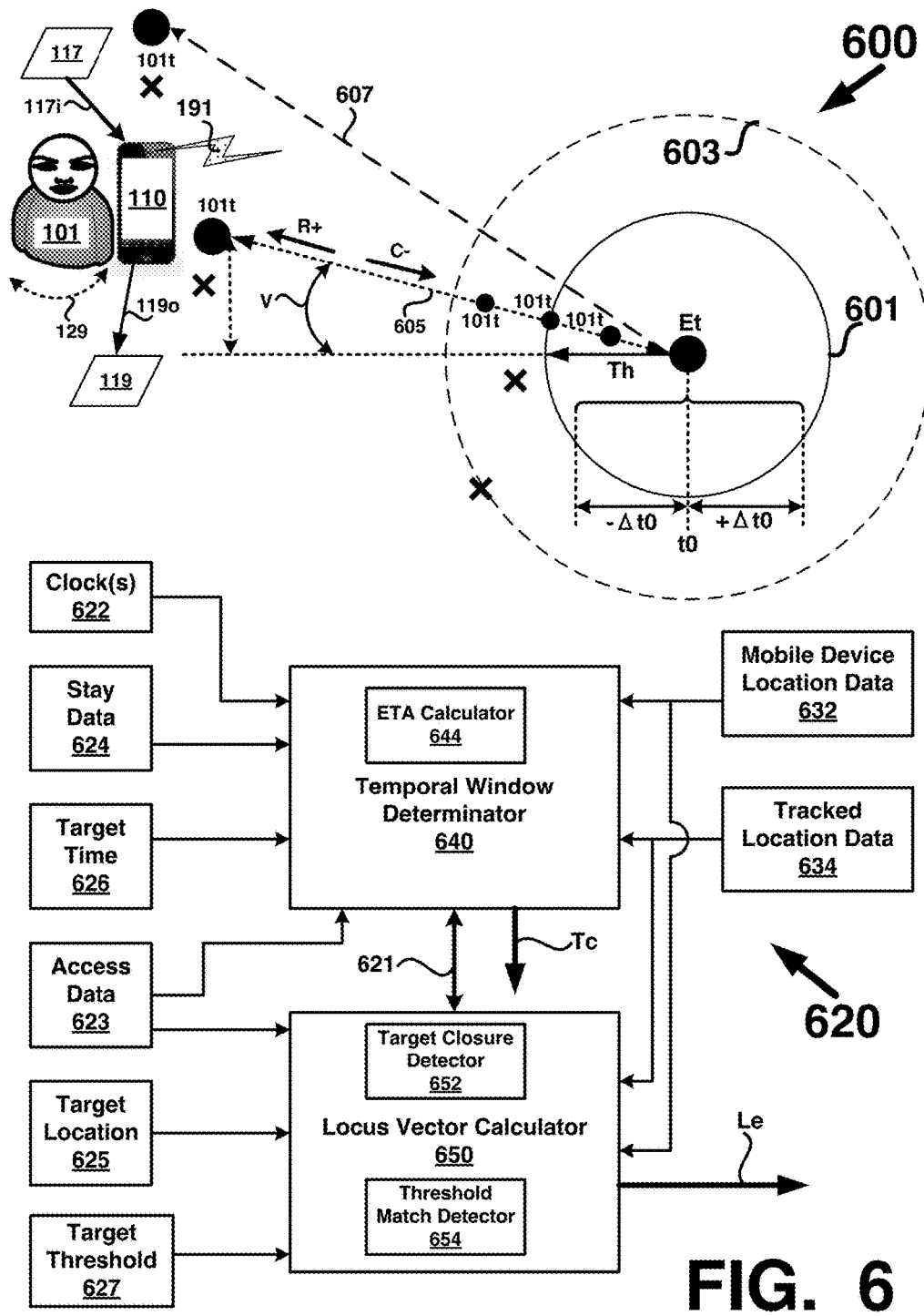
FIG. 6 depicts an example of tracking temporal and location data for a traveler device and an example of a block diagram for a temporal window determinator and a locus vector calculator.

Attention is now directed to FIG. 6 where an example 600 of tracking temporal and location data for a traveler device 110 and an example of a block diagram 620 for a temporal window determinator and a locus vector calculator are depicted. In example 600 an event Et has a threshold Th for an allowable distance for an allowable location for the event Et. For purposes of explanation, threshold Th may define as circle 601 centered about event Et such that the traveler device 110 being on or in the circle 601 positions the traveler 101 within the threshold Th for the event Et. Dashed line 605 represents a distance of the traveler device 110 from the event Et and that distance may change as the traveler device 110 moves in a direction away from the event Et as denoted by R+ (e.g., distance is receding) or traveler device 110 moves in a direction towards the event Et as denoted by C− (e.g., distance is closing). As one example, if distance between the traveler device 110 and the event Et is closing C−, then traveler 101 may be moving 129 in the geographic location 120 for the event Et in a direction towards the as denoted by 101t moving from the left of the drawing sheet to being inside the circle 603 or 601. As another example, if the distance between the traveler device 110 and the event Et is receding R+, then traveler 101 may be moving 129 in the geographic location 120 for the event Et in a direction away from the event Et as denoted line by 101t moving further to the left of the drawing sheet on line 607.

Location data from traveler device 110 and/or from sources external to traveler device 110 may be accessed to calculate the approximate distance between the traveler device 110 and the event Et, the rate of closure C− if the traveler device 110 is moving towards the event, the rate of recession R+ if the traveler device is moving away from the event Et, for example. Temporal data from the traveler device 110 (e.g., from a clock or oscillator in device 110) and/or an external source (e.g., 150, 130, 177) may be used in determining speed of closure C+ or recession R− and/or a velocity of traveler device 110 (e.g., speed and direction) relative to the event Et (e.g., a velocity vector V).

The temporal data and location data may be used to determine an estimated time of arrival of the user 101t at the event Et. For example, a time t0 may be a time associated with the event Et, such as a time for a diner reservation, an appointment etc. Time windows −Δt0 and +Δt0 may represent times prior to (e.g. −Δt0 may mean arriving early) or after (e.g., +Δt0 may mean arriving late) time t0 where the traveler 101t is estimated to arrive within the threshold Th. In some examples, there may be some tolerance to +/−Δt0 arrival times. Location tracking data may be used to determine device 110 speed and/or direction and temporal data may be used to determine an estimated time of arrival (ETA) at the event Et (e.g., at t0 or relative to t0 as +/−Δt0). In some examples, event Et may be in data received (e.g., 117) by device 110 and device 110 may use internal resources (e.g., clock 240, sensors 230, circuitry, location data, location history data) to calculate speed, velocity, ETA and other parameters associated with moving towards C− or away R+ the event Et.

In example 600, the traveler 101 may not have notification of the event Et until the traveler device 110 is within some predetermined distance around the event Et as denoted by dashed line 603. Based on an access request by a subscriber 113, networked system may track devices 110 and upon determining one or more devices 110 that match parameters in the access request are within the predetermined distance 603, a data file may be generated to selected devices within predetermined distance 603. Threshold Th may be 100 meters and predetermined distance 603 may be a larger distance, such as one kilometer, for example.

In block diagram 620 a temporal window determinator 640 is coupled with mobile device location data 632, tracked location data 634, one or more clocks 622, stay data 624 (e.g., from stay data 169), target time (e.g., time t0 from event data 163), access data 623 (e.g., from an access request in 123). A locus vector calculator 650 is coupled 621 with the temporal window determinator 640, the mobile device location data 632, the tracked location data 634, the access data 623, target location 625 (e.g., location for event Et from event data 163), and target threshold 626 (e.g., Th for event Et from event data 163).

The temporal window determinator 640 and/or the locus vector calculator 650 may be included in the traveler device 110, the networked system 150, or be distributed between the device 110 and networked system 150, for example. Clock signals and/or data (e.g., from a clock, oscillator, time base or other circuitry in device 110) may be received by the temporal window determinator 640 and compared with other inputs to the temporal window determinator 640 such as the stay data 624, the target time (e.g., t0), and location data (623 and/or 634).

The temporal window determinator 640 may calculate distance between the event Et and the device 110 using the location data 632 and/or 634, or may receive via coupling 621 with the locus vector calculator 650, data for the distance between the event Et and the device 110 and/or speed or velocity data. An estimated time of arrival (ETA) calculator 644 may use the data and signal inputs to temporal window determinator 640 to determine a time traveler 101 is estimated to arrive within the threshold Th of the event Et. ETA calculator 644 may average speed and/or velocity data to determine an ETA. Temporal window determinator 640 may output a time coincidence signal Tc that indicates the traveler 101 will be positioned within the threshold Th of an allowable distance from an allowable event Et in the geographic location 120r at a time coincident with an event time t0 window for the allowable event Et. Signal Tc may be a "0" if there will not be time coincidence or a "1" if there will be time coincidence. Signal Tc may be a voltage or current signal.

Locus vector calculator 650 may output a locus entry signal Le that indicates a traveler 101 is positioned within the threshold Th of the allowable distance from the allowable event Et. Signal Le may indicate that the traveler device 110 is on or within circle 601 for threshold Th. Locus vector calculator 650 may generate signal Le using a target closure detector 652 to calculate velocity of the device 110 relative to data for target location 625. Target closure detector 652 may output a signal indicating that the device 110 is heading toward the event Et (e.g., signal="1") or away from the event (e.g., signal="0"). A threshold match detector 654 may receive the output signal from the target closure detector 652. The threshold match detector 654 may compare location data 623 and/or 634 with target location 625 while the output signal from the target closure detector 652 is "1" (e.g., indicating the device 110 is closing C− on the event Et). The threshold match detector 654 may compute a distance between the device 110 and threshold Th (e.g., an outer perimeter of the threshold Th denoted by line 601) using velocity and/or speed of device 110, the target location 625, and target threshold 627.

The threshold match detector 654 may output signal Le having a value of "1" when the distance calculation indicates the traveler device 110 is at (e.g., on line 601) or within the threshold Th inside line 601. Signal Le may have a value of "0" when the calculated distance between the traveler device 110 does not place the traveler device on or within the threshold Th as denoted by points "X" in example 600. Signal Le may be a voltage or current signal. Device 110 may use circuitry to generate signals Tc and/or Le and those signals may be converted from an analog signal to a digital signal (e.g., using an A-to-D converter in device 110) and output as data (e.g., 119) to networked system 150.

Figure 7:
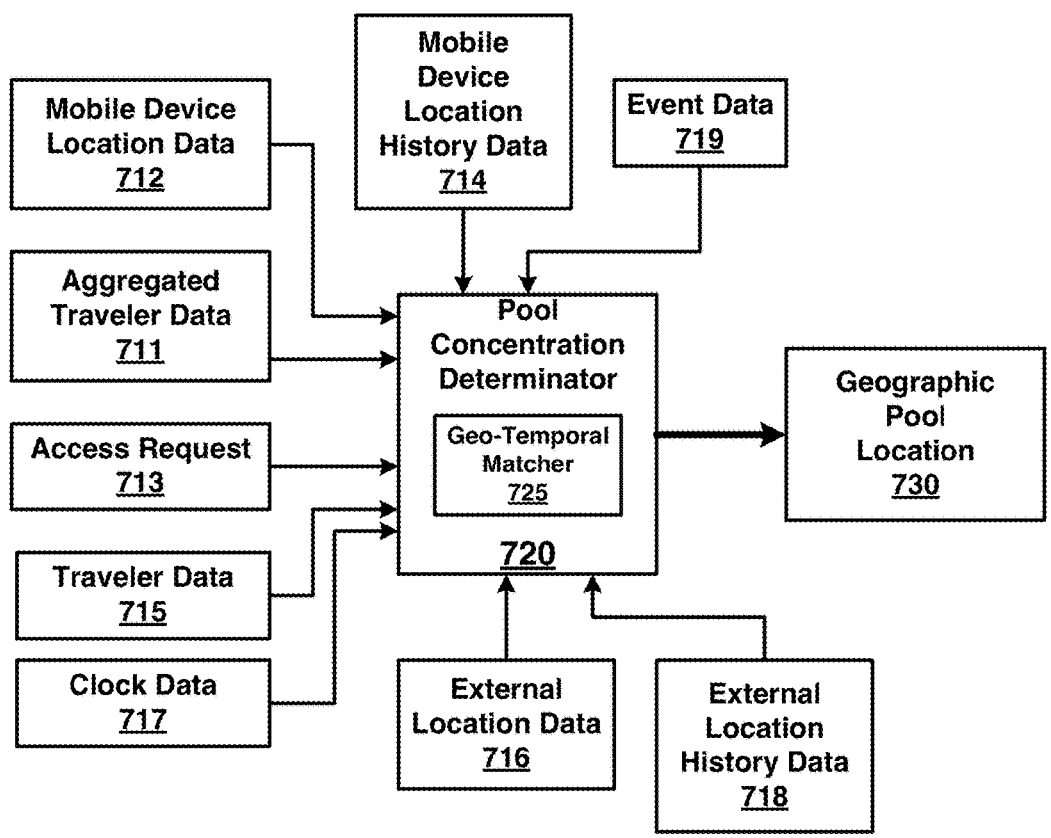
FIG. 7 depicts an example of a block diagram for a pool concentration determinator.

Turning now to FIG. 7 where an example 700 of a block diagram for a pool concentration determinator 720. Pool concentration determinator 720 may receive as inputs, signals and/or data including but not limited to signals and/or data for Tc and Le, event data 719 (e.g., 163), mobile device location history data 714 (e.g., from 147), mobile device location data 712 (e.g., 162, 177), aggregated traveler data 711 (e.g., 172, 166, 169), access request 713 (e.g., 123), traveler data 715 (e.g., 166), clock data 717 (e.g., 240), external location data 716 (e.g., 177), and external location history data 718. Locations for events in event data 719 may be mapped to a geographical location (e.g., 120r). Traveler data 715 and/or aggregated traveler data 711 may be accessed and filtered to extract data representing travelers 101 having travel plans (e.g., stay dates) in the geographical location. Travelers 101 having travel plans in the geographical location may be further filtered by matching location data from one or more sources such as 712, 714, 716 and 718 to further reduce a number of travelers in the geographical location to those having location data consistent with the travelers 101 being in the geographical location. Access request 713 may be applied to match events from subscribers with travelers 101 who match parameters in the access request (e.g., demographics, income level, preferences, purchasing patterns, etc.). Pool concentration determinator 720 may output a signal or data representing a concentration of travelers in a geographic pool location 730.

In some examples, temporal data may be used to determine a concentration of travelers in a geographic location. Pool concentration determinator 720 may receive clock data 717 and signals and/or data for Tc and Le. A geo-temporal matcher 725 may process the clock data 717 (e.g., from clocks 240, stay data 169, event data 719 or 163) and match temporal data for travelers 101 in the traveler pool to classify travelers into different geo-temporal categories. A first category may be those travelers 101 in the pool that are already present in the geographical location. A second category may be those travelers 101 that are not in the geographical location but may arrive in the geographical location at a future time based on a velocity vector indicating the those travelers 101 are moving (e.g., C−) towards the geographical location with some range of ETA's. A third category may be those travelers 101 who's traveler data 715 indicates they will be in the geographical location at a future time. Geo-temporal matcher 725 may sum all three categories to arrive at a sum total of travelers 101 that are in or will be in the geographical location and may output the concentration of travelers in the geographic pool location 730.

The access request may request concentration data for those travelers already located in the geographical location, travelers inbound to the geographical location, or travelers who will be in the geographical location at a future time. Pool concentration determinator 720 may filter the concentration of travelers in the geographic pool location 730 to only include traveler concentrations consistent with the access request (e.g., filters out travelers not already present in the geographical location).

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. A system comprising:
a communications interface;
a data store; and
a computing device in communication with the data store and the communications interface, wherein the computing device is programmed by executable instructions to at least:
receive, via the communications interface, an access data file;
extract, from the access data file, data representing an access request, proprietor data, and proprietor access credentials,
verify the proprietor access credentials;
access from the data store, in response to verification of the proprietor access credentials, data representing a pool of travelers identified by the access request, wherein individual travelers in the pool of travelers are not within a threshold distance of an event at a present time;
select a selected traveler of the pool of travelers based at least partly on a time coincidence signal and a locus entry signal that are wirelessly communicated by a computing device of the selected traveler;
determine that the selected traveler is expected to be within the threshold distance of the event at a future time based at least partly on an analysis of prior location data associated with the selected traveler and current location data associated with the selected traveler;
generate an event data file for the selected traveler; and
communicate, using the communications interface, the event data file to the computing device of the selected traveler via a communications link prior to the future time at which the selected traveler is expected to be within the threshold distance of the event.

2. The system of claim 1, wherein data representing one or more of an activity, a service, or a suggestion is identified by the proprietor data.

3. The system of claim 1, wherein the data store includes one or more of geo-location data for the pool of travelers, temporal data for the pool of travelers, or location history data for the pool of travelers.

4. The system of claim 1, wherein the computing device of the selected traveler is configured to execute the event data file.

5. The system of claim 1, wherein the access data file is generated by a subscriber computing device in communication with the communications interface via another communications link.

6. The system of claim 1, wherein an electronic message is extracted from the event data file, the electronic message addressed to a unique address associated with an account of the selected traveler.

7. A system comprising:
a communications interface;
a data store; and
a computing device in communication with the communications interface and the data store, wherein the computing device is programmed to at least:
receive, via the communications interface, a request data file;
extract, from the request data file, event location data and event temporal data;
access, from the data store via the communications interface, data regarding a pool of travelers;
select, using the event location data and the event temporal data, one or more selected travelers from the pool of travelers, wherein individual selected travelers are not positioned within a threshold distance of a location represented by the event location data at a present time;
select a selected traveler of the one or more selected travelers based at least partly on a time coincidence signal and a locus entry signal that are wirelessly communicated by a computing device of the selected traveler;
access, via the communications interface, individualized data for the selected traveler, the individualized data including one or more of stay data, demographic data, preference data, and location data;
determine that the selected traveler is to be within the threshold distance of the event at a future time that corresponds to the event temporal data, wherein the selected traveler is determined to be expected to be within the threshold distance of the event at the further time based at least partly on an analysis of prior location data associated with the selected traveler and current location data associated with the selected traveler;
generate a data file including customized content for the selected traveler based at least in part on individualized data for the selected traveler; and
communicate, using the communications interface, the data file to the computing device of the selected traveler via a communications link prior to the future time at which the selected traveler is expected to be within the threshold distance of the event.

8. The system of claim 7, wherein at least a portion of content included in the customized content is extracted from the request data file.

9. The system of claim 7, wherein the customized content is based at least in part on the location data of the selected traveler.

10. The system of claim 7, wherein data representing beginning and ending stay dates is extracted from the stay data, and wherein the customized content is based at least in part on the beginning stay date or the ending stay date.

11. The system of claim 7, wherein a number of travelers positioned in the geographic location within a locus of the event location data is determined by a pool concentration determinator.

12. A computer-implemented method comprising:

under control of a computing device configured to execute specific computer-executable instructions, receiving, at a communications interface, an access data file;

extracting, from the access data file, data representing an access request, proprietor data, and data representing proprietor access credentials;

verifying the proprietor access credentials;

accessing traveler data regarding a pool of travelers identified by the access request, wherein individual travelers in the pool of travelers are not within a threshold distance of an event at a present time;

selecting a selected traveler of the pool of travelers based at least partly on a time coincidence signal and a locus entry signal that are wirelessly communicated by a computing device of the selected traveler;

determining that the selected traveler is expected to be within the threshold distance of the event at a future time, wherein the determining is based at least partly on an analysis of prior location data associated with the selected traveler and current location data associated with the selected traveler;

generating an event data file for the selected traveler, the event data file representing one or more of an activity, a service, or a suggestion identified by the proprietor data; and communicating the event data file to the computing device of the selected traveler via a communications link prior to the future time at which the selected traveler is expected to be within the threshold distance of the event.

13. The computer-implemented method of claim 12, wherein the event data file for the selected traveler is generated in response to determining that the selected traveler is likely to be positioned within the threshold distance of the event.

14. The computer-implemented method of claim 12, wherein the event data file for the selected traveler is generated upon receiving, at the communications interface, the time coincidence signal.

15. The computer-implemented method of claim 14, wherein the time coincidence signal is calculated by matching an estimated time of arrival with the event time window, the estimated time of arrival determined using location data and temporal data from a clock signal in the computing device of the selected traveler to calculate a velocity of the computing device in a direction towards the event.

* * * * *

UNITED STATES PATENT AND TRADEMARK OFFICE
CERTIFICATE OF CORRECTION

PATENT NO. : 10,031,644 B2
APPLICATION NO. : 14/594728
DATED : July 24, 2018
INVENTOR(S) : Ryan Hedley Turner et al.

Page 1 of 1

It is certified that error appears in the above-identified patent and that said Letters Patent is hereby corrected as shown below:

In the Claims

In Column 20, Line 37, Claim 7, change "traveler is" to --traveler is expected--

Signed and Sealed this
Twenty-eighth Day of May, 2019

Andrei Iancu
*Director of the United States Patent and Trademark Office*